US011881111B2

(12) United States Patent
Hui et al.

(10) Patent No.: US 11,881,111 B2
(45) Date of Patent: Jan. 23, 2024

(54) MULTIPLE OBJECT COLLISION AVOIDANCE BASED ON CENTRALIZED COORDINATION OF VEHICLE OPERATIONS

(71) Applicant: The Boeing Company, Chicago, IL (US)

(72) Inventors: Leo Ho Chi Hui, Alhambra, CA (US); Haig Francis Krikorian, Fullerton, CA (US)

(73) Assignee: THE BOEING COMPANY, Arlington, VA (US)

( * ) Notice: Subject to any disclaimer, the term of this patent is extended or adjusted under 35 U.S.C. 154(b) by 263 days.

(21) Appl. No.: 17/352,144

(22) Filed: Jun. 18, 2021

(65) Prior Publication Data

US 2022/0051566 A1 Feb. 17, 2022

Related U.S. Application Data

(60) Provisional application No. 63/062,744, filed on Aug. 7, 2020.

(51) Int. Cl.

| | |
|---|---|
| ***G08G 1/16*** | (2006.01) |
| ***G08G 1/052*** | (2006.01) |
| ***G08G 1/01*** | (2006.01) |
| ***G08G 1/056*** | (2006.01) |
| ***G08G 1/0967*** | (2006.01) |

(52) U.S. Cl.

CPC ........... *G08G 1/164* (2013.01); *G08G 1/0133* (2013.01); *G08G 1/052* (2013.01); *G08G 1/056* (2013.01); *G08G 1/096725* (2013.01); *G08G 1/166* (2013.01)

(58) Field of Classification Search

CPC ......... G06T 15/10; G06T 17/10; G06T 15/04; G06T 15/06; G06T 19/20; G06T 2207/10004; G06T 7/0002; G06T 11/80; G06T 17/205; G06T 2200/04; G06T 2207/10012; G06T 2207/10072; G06T 2207/30004; G06T 2219/2016; G06T 2219/2021; G06T 7/12; G06T 7/149; G06T 7/70; G06T 7/73

See application file for complete search history.

(56) References Cited

U.S. PATENT DOCUMENTS

| | | | | |
|---|---|---|---|---|
| 9,443,433 | B1 * | 9/2016 | Conway | G08G 5/0026 |
| 9,786,178 | B1 * | 10/2017 | Bai | G08G 1/166 |
| 2008/0033648 | A1 | 2/2008 | Kelly et al. | |
| 2010/0042418 | A1 | 2/2010 | Olsson | |

(Continued)

*Primary Examiner* — Maceeh Anwari
*Assistant Examiner* — Aarron E Santos
(74) *Attorney, Agent, or Firm* — MH2 Technology Law Group LLP

(57) ABSTRACT

A computer-implemented method performed by a centralized coordinated vehicle guidance system may include: obtaining analytics data for a plurality of vehicles or objects centrally communicating with or detected by the centralized coordinated vehicle guidance system; detecting, based on the analytics data, a predicted collision event involving multiple pairs of the plurality of vehicles or objects; determining trajectory adjustment information for a first vehicle of the plurality of vehicles involved in the collision event; and outputting the trajectory adjustment information to cause the first vehicle to modify its trajectory.

19 Claims, 14 Drawing Sheets

(56) References Cited

U.S. PATENT DOCUMENTS

| | | | |
|---|---|---|---|
| 2012/0005149 A1 | 1/2012 | Chen et al. | |
| 2012/0248237 A1* | 10/2012 | Dolphin | F42B 15/01 244/3.15 |
| 2015/0286219 A1* | 10/2015 | Reichel | G05D 1/0289 701/23 |
| 2020/0269136 A1 | 8/2020 | Gurumurthy et al. | |
| 2022/0044182 A1 | 2/2022 | Krikorian et al. | |
| 2022/0051566 A1* | 2/2022 | Hui | G08G 1/052 |
| 2022/0072432 A1 | 3/2022 | Krikorian et al. | |

* cited by examiner

V4<->V1 CPSP and MSP

V4<->V1 Updated MSP

V4<->V3 CPSP, Latest MSP

V4<->V1, V2, V3 Updated MSP

V1 <-> V2 CPSP and MSP

V1<->V3 CPSP, Latest MSG

V1<->V2, V3 Updated MSP

Expanded View of V1<->V2, V3 Updated MSP

Expanded View of Final MSP and Delta Velocity

710

720

MULTIPLE OBJECT COLLISION AVOIDANCE BASED ON CENTRALIZED COORDINATION OF VEHICLE OPERATIONS

CROSS-REFERENCE TO RELATED APPLICATIONS

This patent application claims priority to and the benefit of U.S. Provisional Application No. 63/062,744 filed Aug. 7, 2020, the entirety of which is incorporated by reference herein.

STATEMENT REGARDING FEDERALLY SPONSORED RESEARCH OR DEVELOPMENT

This invention was made with Government support under Contract No. HQ0147-17-C-0001 awarded by The Missile Defense Agency. The Government has certain rights in this invention.

BACKGROUND

Collision avoidance (CA) in vehicles may involve avoidance of other known objects (e.g., other vehicles, missiles, bullets, or some form of projectile) or unknown objects (e.g., building, solid structure, or other vehicle). Here, an object may be any physical object including a vehicle. Current CA techniques are focused on avoidance between objects that have disparate or opposite trajectories, and not addressing those that have near parallel trajectories and velocities. Further, current techniques are focused on the immediate avoidance between a single vehicle and single object rather than making predictive assessments early to avoid pending collisions between multiple vehicles and objects.

SUMMARY

In one example aspect, a computer-implemented method performed by a centralized coordinated vehicle guidance system may include obtaining analytics data for a plurality of vehicles or objects centrally communicating with or detected by the centralized coordinated vehicle guidance system; detecting, based on the analytics data, a collision event involving multiple pairs of the plurality of vehicles or objects; determining trajectory adjustment information for a first vehicle of the plurality of vehicles involved in the collision event; and outputting the trajectory adjustment information to cause the first vehicle to modify its trajectory.

In another example aspect, a computer program product includes a computer readable storage medium having program instructions embodied therewith. The program instructions are executable by a computing device of centralized coordinated vehicle guidance system to cause the computing device to perform operations including obtaining analytics data for a plurality of vehicles or objects centrally communicating with or detected by the centralized coordinated vehicle guidance system; detecting, based on the analytics data, a collision event involving multiple pairs of the plurality of vehicles or objects; determining trajectory adjustment information for a first vehicle of the plurality of vehicles involved in the collision event; and outputting the trajectory adjustment information to cause the first vehicle to modify its trajectory.

In another example aspect, a system includes: a processor, a computer readable memory, a non-transitory computer readable storage medium associated with a computing device of a centralized coordinated vehicle guidance system, and program instructions executable by the computing device to cause the computing device to perform operations including obtaining analytics data for a plurality of vehicles or objects centrally communicating with or detected by the centralized coordinated vehicle guidance system; detecting, based on the analytics data, a collision event involving multiple pairs of the plurality of vehicles or objects; determining trajectory adjustment information for a first vehicle of the plurality of vehicles involved in the collision event; and outputting the trajectory adjustment information to cause the first vehicle to modify its trajectory.

DETAILED DESCRIPTION

Figure 1:
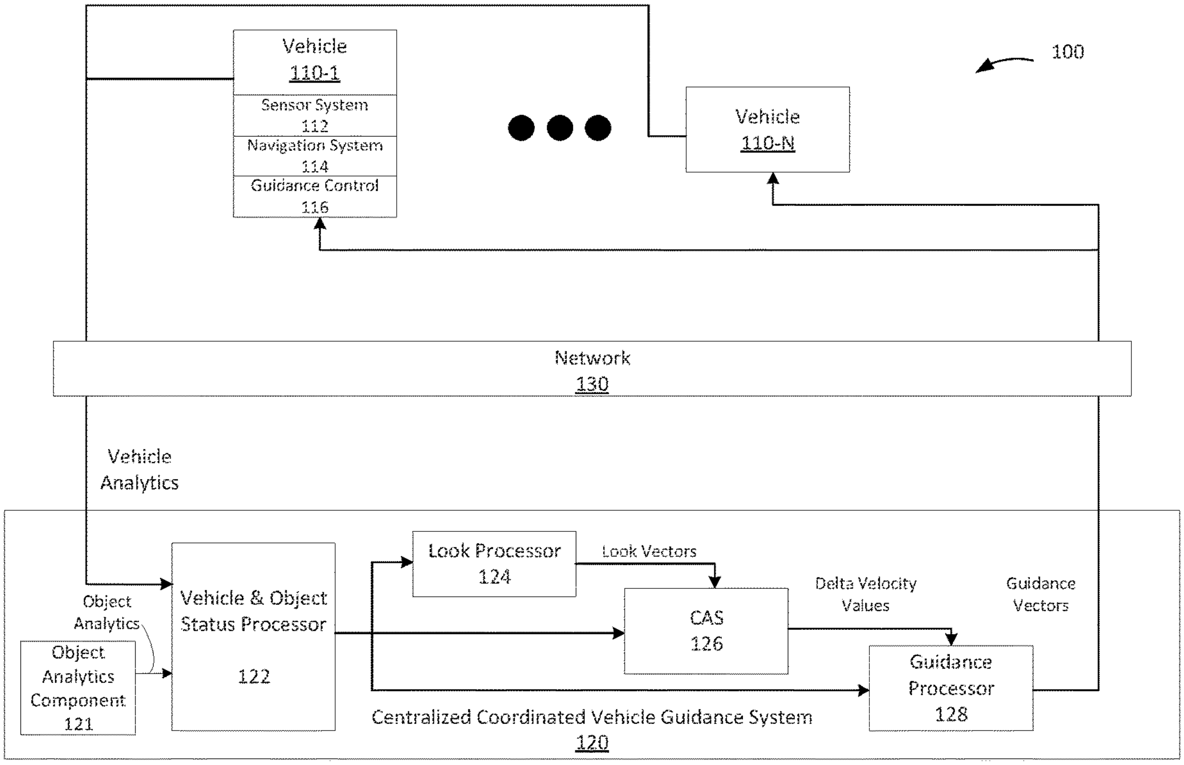
FIG. 1 illustrates an example overview and environment in accordance with aspects of the present disclosure.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

Current collision avoidance (CA) techniques are focused on an immediate avoidance between adverse objects that have disparate or opposite trajectories, rather than non-adverse objects that may have near parallel trajectories and velocities. As such, current CA techniques may not sufficiently detect a situation in which one vehicle may sway off course, thereby endangering the vehicle to hit another vehicle or object, as may be the case with friendly vehicles that may be traveling in relatively the same direction (e.g. team member aircraft in formation, space vehicles, satellites, and/or other vehicles, spacecraft, vehicles on a roadway, etc.). Moreover, existing systems are deficient on detecting collision in which multiple objects are involved, and for providing collision avoidance guidance in a 3-dimensional domain, or providing real-time collision avoidance for space vehicles. Accordingly, aspects of the present disclosure may include a predictive collision avoidance system (CAS) that centralizes vehicle and navigation analytics data for centralized coordination and control of a group of vehicles. In this way, collisions may be avoided early with less reaction and energy demands, whether the vehicles may be traveling in relatively the same direction, or whether the vehicles are traveling in relatively opposite directions. Further, aspects of the present disclosure may be used to provide collision avoidance guidance in which multiple objects are involved, and in the 3-D domain (e.g., for space vehicles). Moreover, aspects of the present disclosure provide real-time collision avoidance (e.g., for use in space vehicles). As used herein, the term "object" may refer to another vehicle, an obstacle/debris, an adversarial object, an unintended moving target, or a virtual object such as a No-Fly Zone boundary, etc.

In some embodiments, aspects of the present discloser may include a collision avoidance system and/or method for providing multiple object collision avoidance (MOCA) using a Constraint Wrap (CW) collision avoidance technique to advance the state of the art in space vehicle collision avoidance technology. In some embodiments, when more than two objects are predicted to collide with one another, the collision system may determine which object(s) to move, their direction, and/or velocity at each real-time update period for as long as the predicted collision event continues (e.g., for as long as the objects are within a threshold distance and at risk for collision). The CW techniques may be optimized for fuel efficiency in 3-D Non-Euclidian space, suitable for single space vehicle or platoon use, and may be integrated into in a real-time autonomous collision avoidance system.

The collision avoidance system and/or method, in accordance with aspects of the present disclosure may include a centralized mission computer or centralized coordinated vehicle guidance system that may monitor vehicle operations and navigation analytics data for each vehicle in a group of vehicles, project the trajectories of each vehicle in the group, determine whether one or more of the vehicles are at risk for colliding based on their projected trajectories, and provide guidance vectors to adjust the trajectory of one or more of the vehicles to avoid a collision. As an illustrative example, the centralized coordinated vehicle guidance system may manage and coordinate the navigation of spacecraft (which may be traveling in similar directions and trajectories) so as to avoid collisions (e.g., with other vehicles or objects), and minimize disruptions in travel, while also minimizing fuel loss from adjusting the trajectory of the spacecraft.

As further described herein, the centralized coordinated vehicle guidance system may adjust the trajectory of vehicles based on monitoring analytics information in real-time for each connected vehicle and/or detected object. Example analytics information that may be monitored may include navigational system data, position data, planned trajectory data, kinematics data, fuel consumption data, fuel level information, or the like. Further, as part of trajectory adjustment, the centralized coordinated vehicle guidance system may factor into account predicted vehicle movement capabilities, maneuverability capabilities, power, acceleration/velocity, vehicle fuel efficiency, etc. In this way, the centralized coordinated vehicle guidance system may centralize vehicle data and operations to accurately track the trajectory of vehicles. This centralized coordination of vehicle data and vehicle operations may forecast potential collisions sufficiently in advance. Further, the centralized coordinated vehicle guidance system may provide guidance vectors and/or control instructions that adjust the trajectory of vehicles to avoid collisions. Further, the collision of vehicles that travel in substantially the same direction may be avoided. As described herein, the collision avoidance techniques, in accordance with aspects of the present disclosure, may handle single pair vehicle to object collision events as well as multiple vehicle/object pair group collision events.

In some embodiments, a multiple object collision avoidance technique using Constraint Wrap, described herein, may reduce collision avoidance solution computation based on computations on boundary points for a loci of solutions rather than interior points. Further, the techniques described herein may extend the capabilities of single pair collision avoidance solutions (e.g., via steer-off or dogleg techniques using Zero-Effort Miss (ZEM) formulation). In some embodiments, the techniques described herein may use distinct single pair collision avoidance solutions as overlays to build up to multiple pair and multiple vehicle collision avoidance solutions. Thus, false solutions from overlay build up misrepresentations may be minimized. Moreover, aspects of the present disclosure may concentrate on movement regions that leads to practical minimal fuel use and reaction collision avoidance solutions. Further, the techniques described herein may accommodate flexibilities and trade-offs between solution accuracy and computational time. Further, the techniques described herein may determine solutions for collision avoidance against small objects, extended objects, barriers, and/or no-entry zones. Additionally, aspects of the present disclosure present collision avoidance solutions in a simple and clear manner, while also identifying no-solution cases. Aspects of the present disclosure may also centrally coordinate and control the movements of vehicles based on multiple collision avoidance solutions.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

FIG. 1 shows an example overview and environment in accordance with aspects of the present disclosure. As shown in FIG. 1, environment 100 includes vehicles 110-1 through 110-N (where N is an integer greater than or equal to 2), a centralized coordinated vehicle guidance system 120, and a network 130.

The vehicles 110 may include any type or variety of vehicles, such as ground vehicles, spacecraft, aircraft, or the like. In some embodiments, each vehicle 110 may include a sensor system 112, a navigation system 114, a guidance control 116, and/or other computing and propulsion components for supporting the operations, guidance, navigation, and/or movement of the vehicle 110. In an example in which the vehicle 110 is a spacecraft, the sensor system 112 may include object detection sensors, motion sensors, temperature sensors, fuel level sensors, vehicle operation sensors, and/or any other variety of sensors. The navigation system 114 may include one or more computing devices that provides navigation services for the vehicle 110, and may track the actual and planned route, path, and/or trajectory of the vehicle 110. In some embodiments, the navigation system 114 may track vehicle movement and/or vehicle trajectory information, such as the vehicle speed, vehicle acceleration, navigation data, vehicle position, vehicle travel direction, etc. The guidance control 116 may include one or more computing devices that controls and/or guides the trajectory of the vehicle 110. In some embodiments, each vehicle 110 may communicate with the centralized coordinated vehicle guidance system 120 for centralized coordinated control of the vehicles 110 in connection with collision avoidance. As described herein, each vehicle 110 may provide vehicle analytics data to the centralized coordinated vehicle guidance system 120. Example vehicle analytics data may include sensor readings, speed, acceleration, position, actual and planned trajectory, vehicle specifications (e.g., vehicle type, vehicle size, maneuverability capabilities, technical specifications, etc.), or the like.

The centralized coordinated vehicle guidance system 120 may include one or more computing devices that centralizes the operations, control, and/or analytics data of vehicles. Further, the centralized coordinated vehicle guidance system 120 may monitor vehicle and object analytics data for detecting potential collisions between the vehicles 110 and/or other objects. In some embodiments, the centralized coordinated vehicle guidance system 120 may be implemented in a vehicle 110. Additionally, or alternatively, the centralized coordinated vehicle guidance system 120 may be a ground-based unit, or a distributed group of ground-based systems, servers, and computing devices. As further shown in FIG. 1, the centralized coordinated vehicle guidance system 120 may include an object analytics component 121, a vehicle and object status processor 122, a look processor 124, a collision avoidance system (CAS) 126, and a guidance processor 128.

The object analytics component 121 may detect the presence of objects within a vicinity of the vehicles 110. As described herein, an object may include a vehicle not connected to the centralized coordinated vehicle guidance system 120, a stationary object, an airborne object, a celestial object, or the like. In some embodiments, the object analytics component 121 may acquire analytics data associated with an object, such as the object's shape/dimensions, object's image, object type, velocity, acceleration, travel path, etc.

The vehicle and object status processor 122 may include one or more computing devices that ingests the vehicle analytics and the object analytics, and provides all or a portion of the vehicle and/or object analytics data to the look processor 124, the CAS 126, and/or the guidance processor 128. In some embodiments, the vehicle and object status processor 122 may process, modify, prune, trim, and/or filter the vehicle analytics and/or the object analytics.

The look processor 124 may include one or more computing devices that identifies a field of view of a vehicle 110 in relation to its propulsion system (e.g., the field of view of sensors implemented on the vehicle 110). The look processor 124 may provide look vectors to the CAS 126 in which the look vectors indicate to the CAS 126 the direction and position in which sensor readings are associated. The look vectors allow the CAS 126 to more accurately forecast a potential collision, and the adjustments to be made for avoiding the collision.

The CAS 126 may include one or more computing devices that receives the look vectors (e.g., from the look processor 124), the processed vehicle analytics data, and/or the processed object analytics data (e.g., from the vehicle and object status processor 122). The CAS 126 may monitor the received data and detect a potential collision event involving multiple vehicle/object pairs. More specifically, the CAS 126 may detect a potential collision between one or more vehicles 110 and/or objects (e.g., based on the forecasted trajectories, velocities, accelerations, etc.). In some embodiments, the CAS 126 may detect potential collisions further based on calculating a zero-effort miss value, and a time to the zero-effort miss. The CAS 126 may determine delta velocity values which the guidance processor 128 may convert into guidance vectors. In some embodiments, the guidance processor 128 may output the guidance vectors to a vehicle 110, and the vehicle 110 may convert the guidance vectors into propulsion system commands that, when executed, alter the trajectory of the vehicles 110-1 to avoid a potential collision.

The network 130 may include one or more wired and/or wireless networks. For example, the network 130 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 130 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 130 may include copper transmission cables, optical transmission fibers, wireless transmission, routers, firewalls, switches, gateway computers and/or edge servers.

The quantity of devices and/or networks in the environment 100 is not limited to what is shown in FIG. 1. In practice, the environment 100 may include additional devices and/or networks; fewer devices and/or networks; different devices and/or networks; or differently arranged devices and/or networks than illustrated in FIG. 1. Also, in some implementations, one or more of the devices of the environment 100 may perform one or more functions described as being performed by another one or more of the devices of the environment 100. Devices of the environment 100 may interconnect via wired connections, wireless connections, or a combination of wired and wireless connections.

Figure 2:
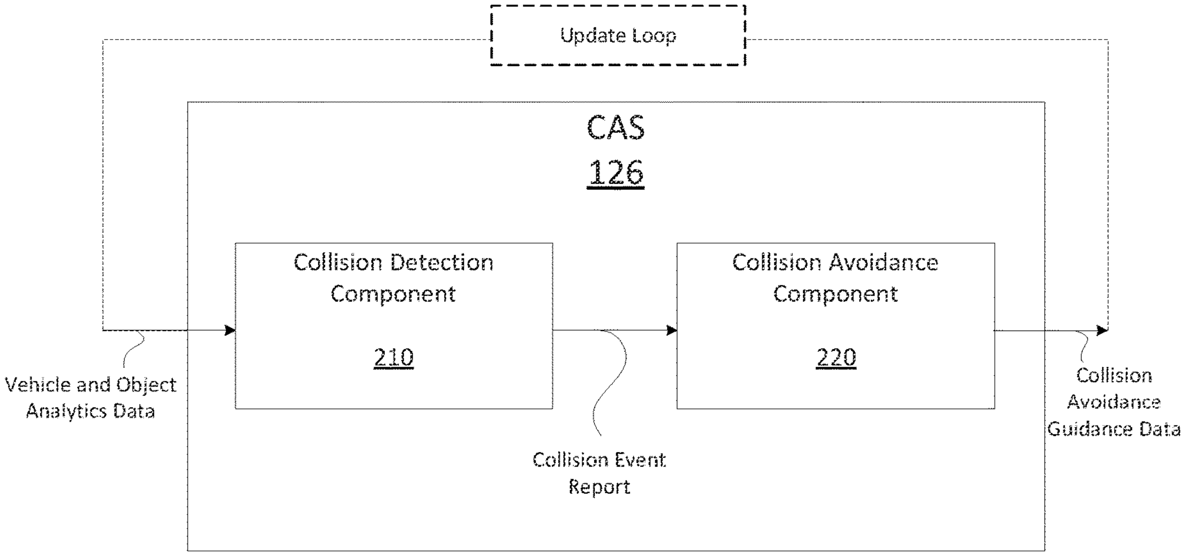
FIG. 2 illustrates example components and operations of a collision avoidance system (CAS) in accordance with aspects of the present disclosure.

FIG. 2 illustrates example components and operations of a collision avoidance system (CAS) in accordance with aspects of the present disclosure. As shown in FIG. 2, the CAS 126 may include a collision detection component 210 and a collision avoidance component 220. In some embodiments, the collision detection component 210 may include one or more computing devices that receives vehicle and objects analytics data, and identifies vehicles 110 that are at risk of collision (e.g., with other vehicles 110 and/or with objects). As described herein, the collision detection component 210 may determine whether a pair of vehicles 110 and/or a vehicle 110 and an object are at risk for collision by using any suitable collision detection technique, such as by calculating a zero-effort miss value (Z), and a time to the zero-effort miss ($T_Z$). If, for example, the values for Z and $T_Z$ do not satisfy safety thresholds, the collision detection component 210 may detect that the vehicle 110 is at risk for a collision. As described herein, the collision detection component 210 may detect and mitigate collisions involving multiple vehicle/object pairs, in addition to collisions involving single vehicle/object pairs. In some embodiments, the collision detection component 210 may generate a collision event report identifying vehicles 110 that are at risk for a collision. Additional operations of the collision detection component 210 are described in greater detail herein with respect to FIG. 3.

The collision avoidance component 220 may include one or more computing devices that receives the collision event report (e.g., from the collision detection component 210), and generates collision avoidance guidance data. In some embodiments, the collision avoidance guidance data may include vectors, navigation instructions/commands, or the like that, when received and executed by a vehicle 110, cause the vehicle 110 to adjust its trajectory to avoid a collision. Additional operations of the collision avoidance component 220 are described in greater detail herein with respect to FIG. 4.

As further shown in FIG. 2, the CAS 126 may incorporate an update loop to update the predicted collision avoidance guidance data in a loop. For example, the CAS 126 may continue to monitor vehicle and object analytics data and generate updated collision avoidance guidance data to continuously monitor, in real time, for collision risks and provide avoidance guidance to the vehicles 110 to avoid collisions in real time.

Figure 3:
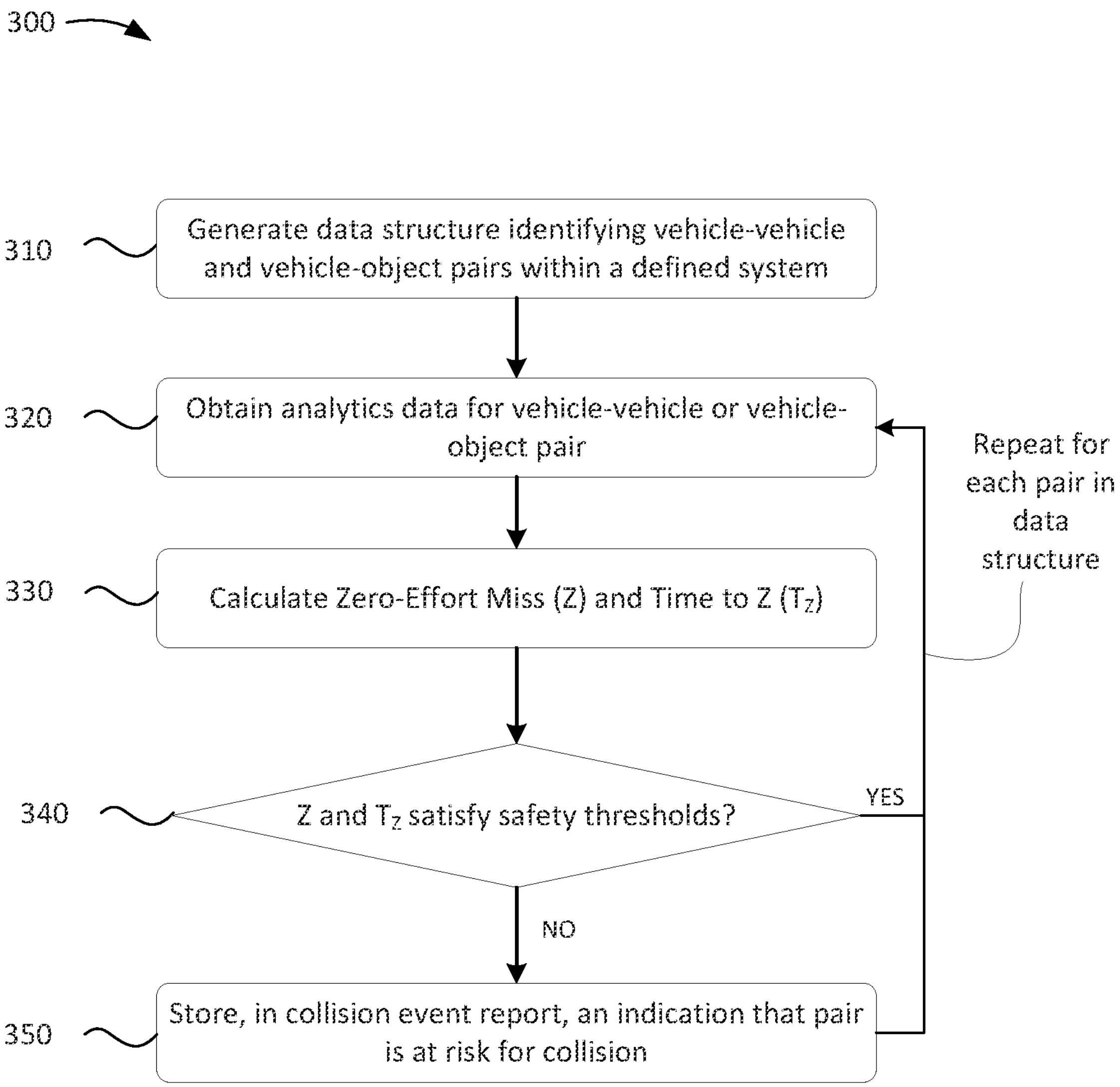
FIG. 3 illustrates an example flowchart of a process for predicting vehicles that are at risk for collision with other vehicles and objects using a coordinated and centralized vehicle communications approach in accordance with aspects of the present disclosure.

FIG. 3 shows an example flowchart of a process for identifying vehicles that are at risk for collision with other vehicles and objects using a coordinated and centralized vehicle communications approach in accordance with aspects of the present disclosure. The blocks of FIG. 3 may be implemented in the environment of FIG. 1, for example, and are described using reference numbers of elements depicted in FIG. 1. The flowchart illustrates the architecture, functionality, and operation of possible implementations of systems, methods, and computer program products according to various embodiments of the present disclosure.

As shown in FIG. 3, process 300 may include generating a data structure identifying vehicle-object pairs within a defined system (block 310). For example, the collision detection component 210 may generate a data structure to identify vehicle-object pairs within a defined system (e.g. a defined boundary, region, set of coordinates, or the like). A “vehicle-object pair” includes a group with one vehicle and one detected object within the defined system (e.g., a pair including one vehicle and another vehicle, or a pair including one vehicle and another type of object). As an example, assume that four vehicles (e.g., collision detection component 210-1, collision detection component 210-2, collision detection component 210-3, and collision detection component 210-4) are connected to the centralized coordinated vehicle guidance system 120 and within the defined system. Given this assumption, one vehicle-object pair includes collision detection component 210-1 and collision detection component 210-2. Another vehicle-object pair includes collision detection component 210-1 and collision detection component 210-2. Similarly, another vehicle-object pair includes collision detection component 210-1 and collision detection component 210-3, and so on and so forth. The collision detection component 210 may store information identifying all of the vehicle-object pairs.

Process 300 also may include determining analytics data for a vehicle-object pair (block 320). For example, the collision detection component 210 may obtain analytics data (e.g., vehicle or object analytics data for each vehicle 110 or object) for a particular vehicle-object pair identified in the data structure. As previously mentioned, example vehicle analytics data may include sensor readings, speed, acceleration, position, actual and planned trajectory, vehicle specifications (e.g., vehicle type, vehicle size, maneuverability capabilities, technical specifications, etc.), or the like. Additionally, or alternatively, vehicle analytics data may include, between each vehicle-object pair, the relative speed, positions, accelerations, maneuvers, etc. Example object analytics data may include the object’s shape/dimensions, object’s image, object type, velocity, acceleration, travel path, etc. In some embodiments, the vehicle and/or object analytics data may be used to plot or map a future predicted trajectory between the two vehicles 110 in a vehicle-object pair, and/or the trajectory between a vehicle 110 and an object in a vehicle-object pair. As described herein, the vehicle and/or object analytics data may be used to detect a vehicle collision event, as described in greater detail herein.

Process 300 further may include calculating a zero-effort miss vector (Z) and a time value to the zero-effort miss point ($T_Z$) (block 330). For example, the collision detection component 210 may calculate Z and a time $T_Z$ as part of detecting a vehicle collision event within a vehicle-object pair. In some embodiments, Z may indicate the minimum relative position vector that occurs as a first vehicle 110 or object passes a second vehicle 110 or object, assuming the second object’s thrust vector were to cease and both objects were to coast under the acceleration of gravity only. That is, Z describes the point of closest approach whereas $T_Z$ indicates a time when this point will occur. A magnitude of Z being smaller than the combined sizes of encroaching objects and a value of $T_Z$ being or around 0 indicates that a collision may be imminent, corresponding to a vehicle collision event. In some embodiments, $T_Z$ may represent the severity of a collision event. When a future predicted trajectory between a vehicle 110 and an object in a vehicle-object pair is plotted on a trajectory map, a $T_Z$ value of or around 0 may be represented, on the trajectory map, as a collision between the vehicles 110 or the vehicle 110 and the object (e.g., as described in greater detail with respect to FIG. 5 and FIG. 6).

Process 300 also may include determining whether Z and $T_Z$ satisfy safety thresholds. (block 340). For example, the collision detection component 210 may determine whether Z and $T_Z$ satisfy safety thresholds (e.g., the closest point of approach Z is sufficiently large, and the time $T_Z$ to this point Z is sufficiently long). In some embodiments, the safety thresholds for Z and $T_Z$ may be configurable and may take into consideration the vehicle and object sizes, safe distance, and the response capability of the vehicle 110 to perform a collision avoidance maneuver. Additionally, or alternatively, the safety thresholds for Z and $T_Z$ may be based on the level of detection. For example, an appropriately conservative level of detection may result in earlier detection, thereby reducing the level of disruption of a collision avoidance maneuver and reducing gas consumption, whereas an overly conservative level of detection may result in the performance of unneeded collision avoidance maneuvers.

If, for example, Z and $T_Z$ do not satisfy safety thresholds (block 340-NO), process 300 may further include storing, in a collision event report, an indication that the pair (e.g., the vehicle-object pair in question) is at risk for a collision (block 350). In some embodiments, the collision detection component 210 may output the collision event report, to the collision avoidance component 220, in which the collision event report indicates vehicle-object pairs at risk for collisions. In some embodiments, described herein, the collision avoidance component 220 may use the collision event report to analyze the trajectory of each vehicle within each vehicle-object pair that is at risk for collision, and generate guidance vectors, delta velocity information, trajectory adjustment control instructions, etc., that, when executed, cause the vehicle 110 to avoid a collision.

As further shown in FIG. 3, process 300 may return to block 320 whereby blocks 320-350 may be repeated for each vehicle-object pair identified in the data structure generated at step 310. In this way, the collision risk may be identified for each vehicle-object pair. In some embodiments, the collision detection component 210 may add to the collision event report each time a collision risk is identified for a vehicle-object pair. Further, if a new vehicle 110 is connected to the centralized coordinated vehicle guidance system 120, and/or a new object is detected, the data structure may be updated to reflect the newly connected and detected vehicle 110 and/or object, and process 300 may be repeated. Also, if, at block 340, Z and $T_Z$ satisfy safety thresholds (block 340—YES), process 300 may return to block 320 without storing an indication that the pair in question is at risk for collision, since satisfaction of the safety thresholds indicates that a collision risk does not exist.

Figure 4:
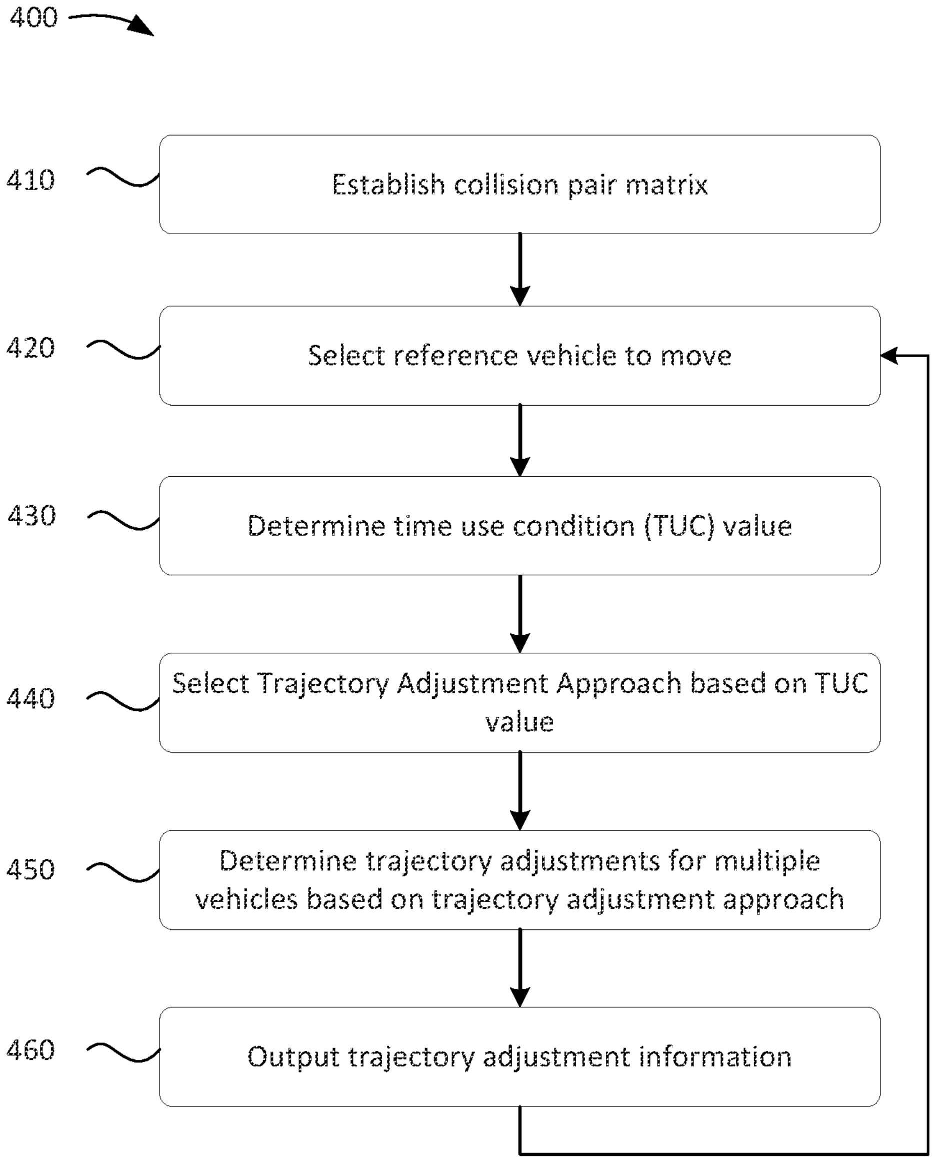
FIG. 4 illustrates an example flowchart of a process for generating and outputting delta velocity information for adjusting the trajectory of vehicles at risk for a collision.

FIG. 4 shows an example flowchart of a process for generating and outputting delta velocity information for adjusting the trajectory of multiple vehicles to avoid collisions. The blocks of FIG. 4 may be implemented in the environment of FIG. 1, for example, and are described using reference numbers of elements depicted in FIG. 1. As described herein, the process shown in FIG. 4 may be based on a constraint wrap approach for multiple object collision avoidance with consideration to fuel efficiency and minimizing fuel consumption as part of collision avoidance while maintaining a safe distance between vehicles and objects.

As shown in FIG. 4, process 400 may include establishing a collision pair matrix (block 410). For example, the collision avoidance component 220 may establish a collision pair matrix, which may involve generating a table of all possible collision pair combinations. In some embodiments, the collision pair matrix may be generated based on a collision event report or an indication that a vehicle-object pair is at risk for collision (e.g., as identified by the collision detection component 210 in accordance with process 300 of FIG. 3). As described above, the collision event report identifies collision risks for each vehicle-object pair. As one illustrative example, the collision pair matrix involving vehicles V1 and V2, and objects O1 and O2 is provided in Table 1 below in which "x" denotes a possible collision between the vehicles and objects. As described herein, the objects O1 and O2 may be vehicles or object outs of the control of the centralized coordinate vehicle guidance system 120, whereas the vehicles V1 and V2 are "friendly" vehicles that are centrally controlled and moveable by the vehicle guidance system 120. In the example shown below, the vehicles V1 and V2 are at risk for colliding with each other and with other objects shown in Table 1.

TABLE 1

Example Collision Pair Matrix

| Collision Pair Matrix | V1 | V2 | O1 | O2 |
|---|---|---|---|---|
| V1 | — | x | x | x |
| V2 | x | — | — | x |

Process 400 may further include selecting a reference vehicle to move (block 420). For example, the collision avoidance component 220 may select a reference vehicle in the collision pair matrix to move (e.g., the centrally controllable vehicles V1 and V2 in the example described herein). More specifically, the collision avoidance component 220 may consider each row of vehicles and the collision pairs that are involved to select which of V1 or V2 should move to avoid the collision (as O1 and O2 are non-controllable). Example criteria for selecting the reference vehicle may include fuel levels of the controllable vehicles (e.g., higher preference to move a vehicle with higher fuel levels), vehicle maneuverability capabilities (e.g., higher preference to move a vehicle with greater maneuverability capabilities), relocation distance required to move to avoid collision (e.g., higher preference to move a vehicle with lower relocation distance), measure of importance of vehicle mission objectives (e.g., lower preference to move vehicles with higher measures of vehicle mission objectives importance), etc. As an example, V1 may be selected as the vehicle to move. Based on selecting V1, the collision pair matrix may be updated as shown in Table 2. Each row in Table 2 indicates collisions that may occur where "R" denotes the reference vehicle for each row. As shown in Table 2, when V2 is the reference vehicle, V2 is no longer at risk for collision with V1 as V1 was selected to be moved. As further shown in Table 2, V1 may have be at risk for collisions with multiple vehicles/objects, whereas V2 may be at risk for collision with only a single object.

TABLE 2

Example Collision Pair Matrix with Reference Vehicle Designation

| Collision Pair Matrix | V1 | V2 | O1 | O2 |
|---|---|---|---|---|
| V1, R | — | x | x | x |
| V2, R | — | — | — | x |

As described herein, collision avoidance vectors may be determined for each reference vehicle (e.g., each row in the collision pair matrix). Thus, process blocks 420-460 may be repeated for each collision pair (e.g., each row in the collision pair matrix). For collisions involving multiple vehicles/objects (e.g., V1 in the example described herein), a multiple object collision avoidance approach may be used, whereas for collisions involving only another single vehicle/object (e.g., V2 in the example described herein), a single object collision avoidance approach may be used. The techniques described herein may pertain to the multiple object collision avoidance approach, although the techniques described herein are not necessarily limited to multiple object collision avoidance and may be applied for single object collision avoidance.

As described herein, collision events may be continuously detected in accordance with the process 300 of FIG. 3. Thus, so long as the collision detection distance is larger than the vehicle collision avoidance travel between detection refreshes, independent handling of each vehicle's multiple object collision avoidance is safe from unintended collisions from one interval to the next.

Process 400 further may include determining a time use condition (TUC) value (block 430). In some embodiments, the TUC value may describe a level of urgency to adjust the reference vehicle's trajectory, and may be based on the $T_Z$ value as well as a distance or range between the reference vehicle 110 and the vehicle or object at risk of colliding with the reference vehicle. Also, the TUC value may be based on a maximum tolerance threshold change in velocity for the reference vehicle to avoid a collision, which may be used to define a collision avoidance or trajectory adjustment approach (e.g., a gradual "steer-off" approach, or a sharper "dog-leg" approach). For example, as described in further detail herein, a greater change in velocity may be more likely to avoid a collision with a lower deviation in trajectory path/angle (i.e., a lower level of disruption in original trajectory of the reference vehicle 110), but at the expense of greater consumption of fuel. Conversely, a lower change in velocity may result in a lower consumption of fuel, but may require more frequent trajectory change to avoid a collision (i.e., a higher level of disruption in original trajectory). Thus, the TUC value may factor in the maximum tolerance threshold change in velocity for the reference vehicle, which may be based on fuel consumption limits, reference vehicle capabilities, maneuverability capabilities, etc. Additionally, or alternatively, the TUC value may factor in a maximum tolerance change in trajectory path or angle.

Process 400 also may include selecting a trajectory adjustment approach based on the TUC value (block 440). For example, the collision avoidance component 220 may select a trajectory adjustment approach based on the TUC value. In some embodiments, the trajectory adjustment approach may describe degree or sharpness of the trajectory adjustment (e.g., a gradual or "steer-off approach" adjustment, or a sharp "dog-leg approach" adjustment). In some embodiments, the collision avoidance component 220 may store thresholds identifying which adjustment approach to select based on the TUC value. Additionally, or alternatively, the trajectory adjustment approach may be further based on additional factors, such as vehicle fuel efficiency, maneuverability capabilities, mission objectives, kinematics, destination information, or the like.

In general, the trajectory adjustment approach may be selected so as to create a threshold separation between the reference vehicle and the vehicle or object at risk of a collision, with a minimal change in trajectory and/or velocity (thereby reducing fuel consumption and disruption of the reference vehicle's original trajectory). While the steer-off approach may minimize a change in trajectory direction (thus minimizing the disruption in mission objectives of the reference vehicle), the steer-off approach may require a greater change in velocity than the dog-leg approach to achieve a threshold separation between the reference vehicle 110 and the vehicle or object at risk of a collision. Thus, if the change in velocity required to avoid a collision (e.g., create separation) using the steer-off approach is below a tolerance threshold, the steer-off approach may be used, thereby minimizing the change in trajectory direction, and minimizing disruption of the reference vehicle's trajectory (e.g., in a situation in which the reference vehicle and at-risk vehicle/object are traveling in substantially the same direction). On the other hand, if the change in velocity required to avoid a collision using the steer-off approach exceeds a tolerance threshold, the dog-leg approach may be selected instead (e.g., in a situation in which the reference vehicle 110 and at-risk vehicle/object are traveling in substantially opposite directions). Similarly, if the steer-off approach would not avoid the collision, even at the reference vehicle's 110 maximum potential velocity, the dog-leg approach may be selected.

In some embodiments, a different trajectory adjustment approach may be selected. That is to say, the trajectory adjustment approach may be a quantitative value, such as the angle or direction of the trajectory adjustment, whereby the angle/direction is selected to minimize changes in direction and velocity, while still creating sufficient separation to avoid a collision. In general, the angle at which the trajectory is adjusted, and the change in velocity may be minimized while still creating sufficient separation as to avoid a collision. In some embodiments, regardless of the trajectory adjustment approach used, Zero-Effort Miss (ZEM) vectors may be determined and used for deriving multiple object collision avoidance solutions.

Process 400 further may include determining trajectory adjustments based on the trajectory adjustment approach (block 450). For example, the collision avoidance component 220 may determine trajectory adjustments based on the trajectory adjustment approach. In some embodiments, the trajectory adjustments may identify delta velocity information, which may be either negative (e.g., to slow the reference vehicle) or positive (e.g., to speed up the reference vehicle). Additionally, or alternatively, the trajectory adjustments may identify guidance vectors corresponding to a change in trajectory direction and/or angle. In general, the collision avoidance component 220 may minimize changes in velocity and/or trajectory direction while satisfying safety thresholds of Z and $T_Z$ (e.g., thresholds describing the relative position between the reference vehicle and other vehicle/object, and time durations to this relative position). Additionally, or alternatively, the collision avoidance component 220 may optimize or minimize changes to other factors, such as acceleration, fuel consumption, trajectory disruptions, etc.

As described in greater detail herein, the trajectory adjustments (i.e., the collision avoidance solution) may involve determining the union of solutions for all the collision pairs involved, thereby finding the minimum delta velocity point (i.e. $\min\|dRV_{xy}\|$) among the union of solutions, and computing the collision avoidance move solution (e.g., corresponding to the trajectory adjustments). This point produces the lowest delta velocity for the reference vehicle to avoid the group collision. As further described herein, ZEM vector solutions may be used to establish solution points to configure a Collision Pair Solution Polygon (CPSP) representing a predicted collision space in which the reference vehicle may be at risk for collision with another vehicle or object in the collision pair. The number of points and point spacing to use to establish the CPSP may be a design choice. As one example, up to forty points may be used to form a CPSP. Point spacing may be variable between points to provide finer maneuver solutions near regions of interest.

In some embodiments, different ZEM vector solution equations may be used to develop the ZEM vector solutions based on the different trajectory adjustment approaches. With respect to the dogleg approach, a locus of ZEM vector solutions may form an ellipse when plotted. Since the dogleg approach establishes points for this ellipse as a byproduct of determining the collision avoidance solution, this ellipse expressed in the body frame of the reference vehicle is the CPSP. As further described herein, with respect to the steer-off approach, the locus of ZEM vector solutions may form a parallelogram when plotted. As described herein, the CPSP interior may be a region where collision avoidance may be needed. The point $(dRV_{B,2}, dRV_{B,3})=(0, 0)$ may be present in which the collision avoidance component 220 may locate the closest point on the CPSP boundary to (0, 0).

In some embodiments, a constraint wrap approach may be implemented in which the CPSPs from each collision pair are overlaid together. The union of the solution boundaries in the overlay may be determined using a boundary union determination algorithm. This union of boundaries forms an updated Multiple Solution Polygon (MSP) and may be used to overlay with the next CPSP. When the final CPSP is overlaid and the final union of solution boundaries is completed the final updated MSP is produced. The collision avoidance component 220 may then determine whether $(dRV_{B,2}, dRV_{B,3})=(0, 0)$ is inside or outside of the MSP by using a point-in-polygon determination algorithm such as the Ray Casting algorithm. If inside the MSP, the point on the MSP boundary with minimal $\|dRV_{xy}\|$ from the origin may be determined. The coordinate of this point may represent the delta velocity to apply to the reference vehicle. In other words, the collision avoidance component 220 may determine the minimal delta velocity such that the reference vehicle is no longer in the collision space represented by the MSP. In this way, the minimum amount of movement may be determined for the reference vehicle to be moved to avoid a collision so as to minimize fuel expenditure and/or disruptions from collision avoidance repositioning. If outside of the MSP, the minimal $\|dRV_{xy}\|$ may be set to 0, reflecting that a collision avoidance move may not be necessary to achieve a threshold avoidance distance. If avoidance move is not necessary, the delta velocity vector may be the 0 vector. Examples of determining collision avoidance solutions and corresponding trajectory adjustments using CPSPs are described in greater detail below with respect to FIGS. 5A-5G, and 6A-6D.

Process 400 also may include outputting the trajectory adjustment information (block 460). For example, the collision avoidance component 220 may output the trajectory adjustment information (e.g., to the reference vehicle). In some embodiments, the trajectory adjustment information may be in the form of guidance vectors, changes in velocity/acceleration, propulsion control instructions/commands, etc., that when executed, cause the trajectory of the reference vehicle to change so as to avoid a collision. In some embodiments, the trajectory adjustment information may include navigation data, vehicle propulsion control instructions, vehicle speed, vehicle travel direction, etc.

As shown in FIG. 4, process 400 may be repeated for each reference vehicle at risk for a collision, and for each vehicle-object pair (e.g., predicted vehicle-object pairs at risk for collisions as identified in the collision event report). In this way, the trajectory of each vehicle that is at risk for a collision may be adjusted in a manner that minimizes disruption and fuel consumption. Also, by repeating process 400 for each vehicle involved in an at-risk collision event, the collision avoidance component 220 may determine whether the trajectory adjustments (e.g., the delta velocity information, corresponding guidance vectors, etc.) produced at block 460 may result in a collision with a different vehicle. Accordingly, the collision avoidance component 220 may repeat process 400 to make further adjustments to avoid additional collisions. In some embodiments, prior to outputting the delta velocity information (e.g., at block 460), the collision avoidance component 220 may run a simulation to identify whether the trajectory adjustments will result in collision avoidance between the reference vehicle in the vehicle-object pair in question, and whether a collision may occur between the reference vehicle and a different vehicle or object outside of the vehicle-object in question.

As described above with respect to FIGS. 3 and 4, the operations and/or controls of vehicles 110 may be centrally coordinated by centrally collecting vehicle and objects analytics data to track and monitor the relative positions of vehicles and objects. This central collection of analytics data allows the centralized coordinated vehicle guidance system 120 to monitor vehicle and object trajectories, proactively predict collision risks, and take mitigating collision avoiding actions to avoid collisions while considering the trajectory of all vehicles 110 connected to the centralized coordinated vehicle guidance system 120 and objects detected by the centralized coordinated vehicle guidance system 120. In this way, collisions may be avoided, whether the vehicles 110 may be traveling in relatively the same direction, or whether the vehicles 110 are traveling in relatively opposite directions. Further, collision avoidance guidance may be provided in which multiple vehicles 110 are involved, and in the 3D domain (e.g., for space vehicles). Moreover, real-time collision avoidance (e.g., for use in space vehicles) may be provided. As described herein, the analytics data may include object acceleration, object dimensions, object image data, object shape, object travel path, object velocity, vehicle acceleration, vehicle maneuver capabilities, vehicle position, vehicle sensor readings, and/or vehicle speed.

While process 400 illustrates one example for performing multiple objection collision avoidance, other examples are possible. For example, the collision avoidance component 220 may generate a different collision pair matrix in a similar manner as discussed above with respect to process block 410. Table 3 illustrates another example collision pair matrix at a given time index.

TABLE 3

Example Collision Pair Matrix

| | V1 | V2 | V3 | V4 |
|---|---|---|---|---|
| V1 | — | — | — | x |
| V2 | — | — | — | x |
| V3 | — | — | — | x |
| V4 | x | x | x | — |

As shown in Table 3, a collision event may be present in which vehicle V4 may be at risk of colliding with vehicles V1, V2, and V3. In accordance with process block 420, the collision avoidance component 220 may select V4 as the reference vehicle to move (e.g., based on the assumption that V4 has the most delta velocity available, fuel levels, maneuverability, etc.). Thus, when V4 is selected as the reference vehicle, vehicles V1, V2, and V3 may no longer need to take any collision avoidance actions, since V1, V2, and V3 will no longer be at risk for collisions when V4 is moved. To reflect this situation, collision avoidance component 220 may update the collision pair matrix with the selected reference vehicle as shown in Table 4.

TABLE 4

Example Collision Pair Matrix After Selecting Reference Vehicle

| | V1 | V2 | V3 | V4 |
|---|---|---|---|---|
| V1 | — | — | — | — |
| V2 | — | — | — | — |
| V3 | — | — | — | — |
| V4, R | x | x | x | — |

The collision avoidance component 220 may determine the time use condition value and select a trajectory adjustment approach (e.g., as described above with respect to process blocks 430 and 440). In this example, assume that the collision avoidance component 220 selects the "dogleg" approach. The collision avoidance component 220 may determine trajectory adjustments for V4 in accordance with process block 450. More specifically, the collision avoidance component 220 may determine each pair's Collision Pair Solution Polygon (CPSP) and sequentially overlay each CPSP to update the Multiple Solution Polygon (MSP), as is shown in the example of FIGS. 5A-5G. That is, with each CPSP overlay, the MSP is updated to include the union of the CPSP of each collision pair. As described herein, the CPSP may represent the collision space between the reference vehicle (V4, in this example) and another vehicle in the collision pair. Thus, the MSP including the union of all CPSPs for all collision pairs may represent the collision space for between the reference vehicle and all other vehicles at risk for colliding with the reference vehicle.

Figure 5A:
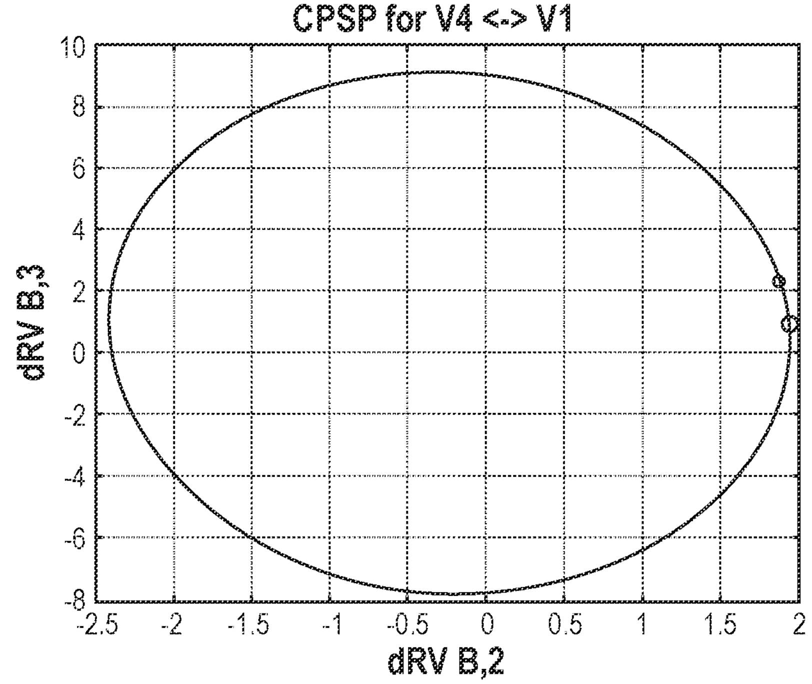
FIGS. 5A-5G illustrate an example of using constraint wrapping of Collision Pair Solution Polygons (CPSPs) for multiple object collision avoidance using a "dogleg" avoidance approach.
Figure 5B:
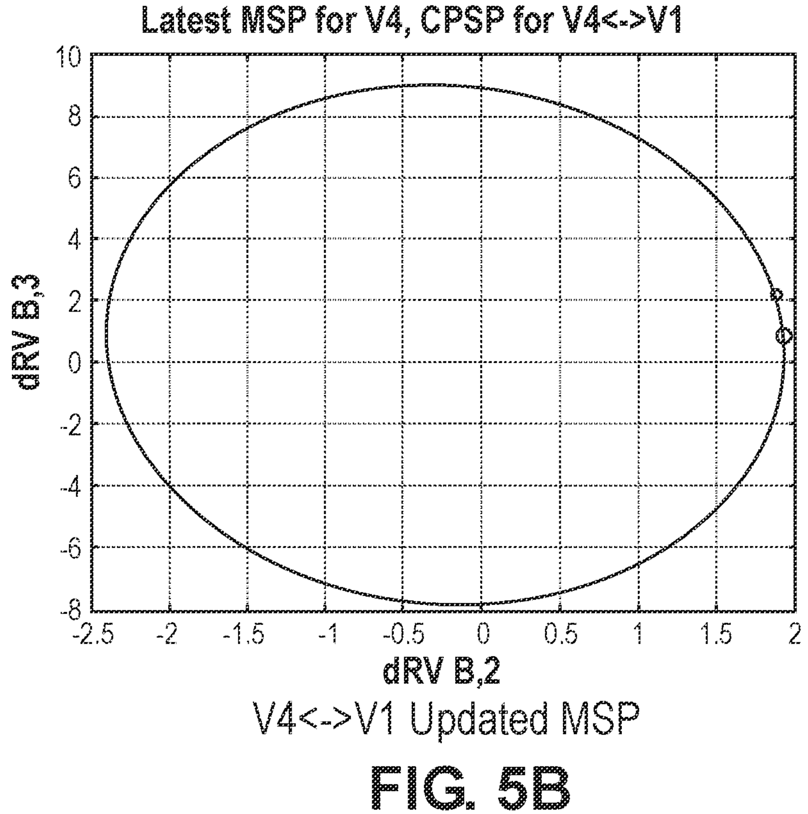
Figure 5C:
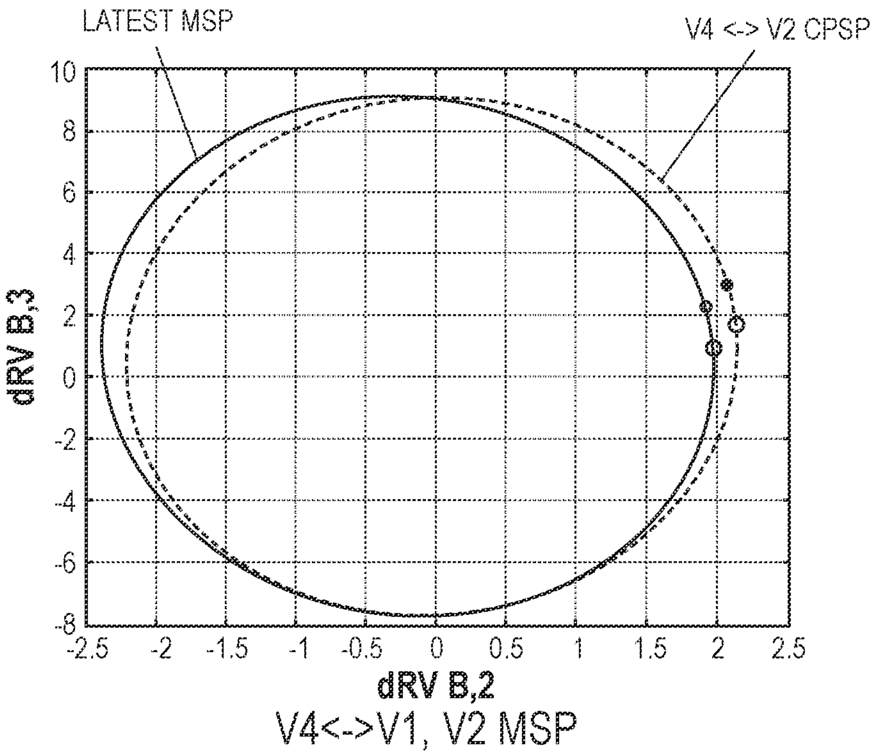
Figure 5D:
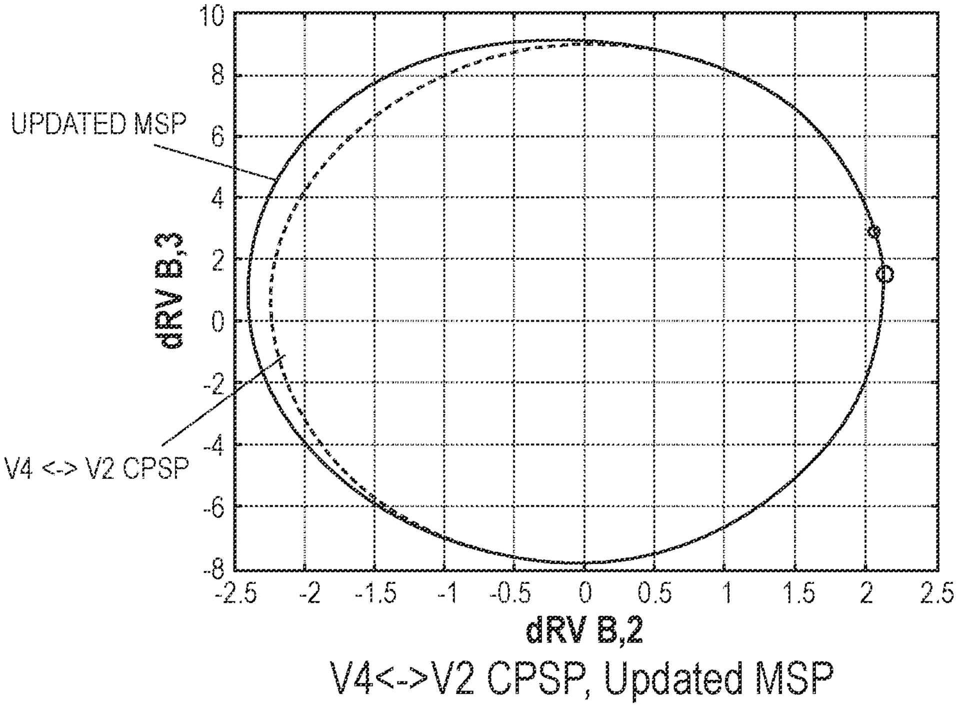
Figure 5E:
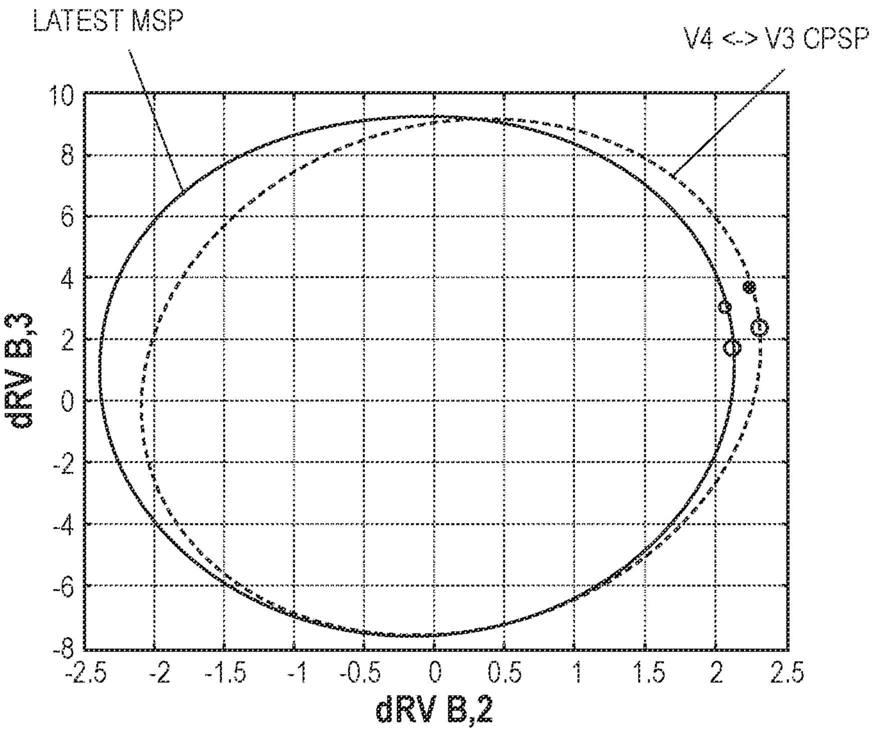
Figure 5F:
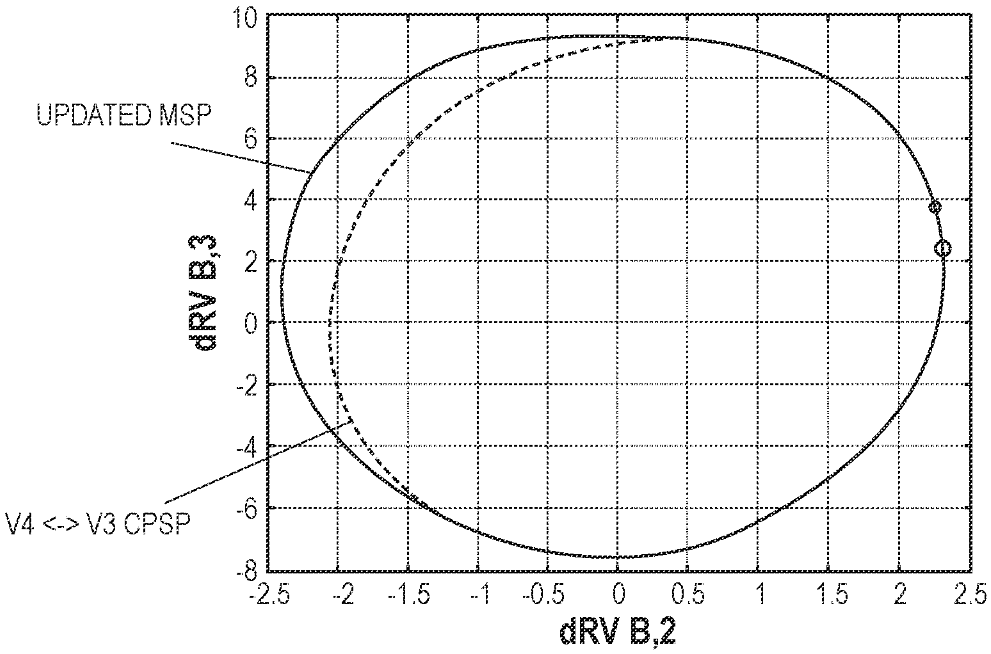
Figure 5G:
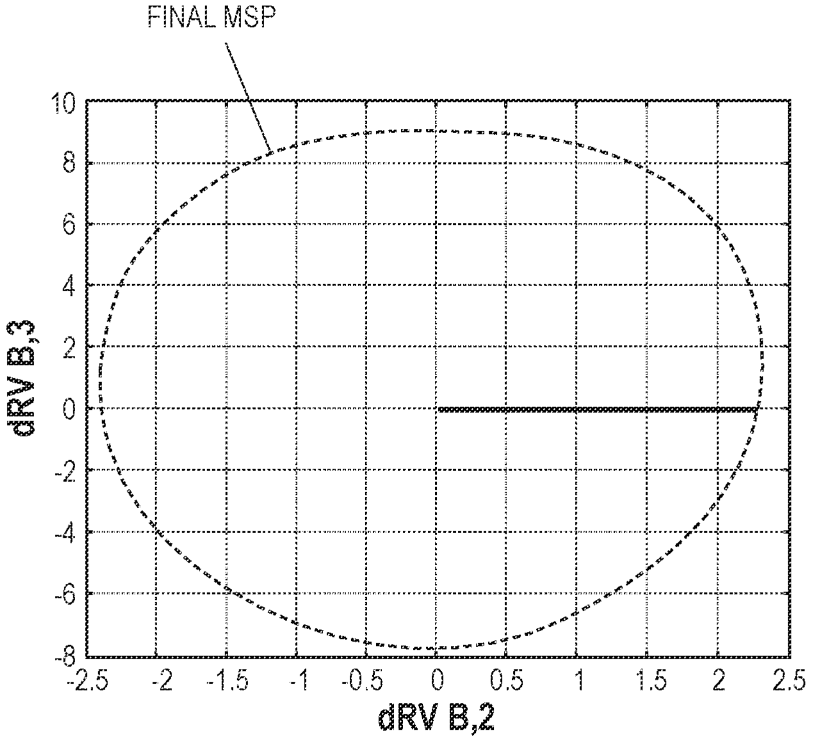

With reference to FIG. 5A, the collision avoidance component 220 may map the CPSP for the V4 to V1 collision pair (denoted as V4↔V1). Referring to FIG. 5B, the collision avoidance component 220 may update the CPSP to form the MSP, however, in this case, since no other collision pairs have yet been mapped, the MSP includes only the CPSP between V4 and V1. Referring to FIG. 5C, the CPSP between V4 and V2 may be overlaid on to the MSP of FIG. 5B as shown. Referring to FIG. 5D, the MSP may be updated to include the union of the MSP from FIG. 5C and the CPSP between V4 and V2 from FIG. 5C. Referring to FIG. 5E, the CPSP between V4 and V3 may be overlaid on top of the MSP from FIG. 5D. Referring to FIG. 5F, the MSP may be updated with the union of the MSP from FIG. 5E and the CPSP between V4 and V3 from FIG. 5E. Referring to FIG. 5G, the largest outer boundary of the MSP is shown and the shortest distance outside of the CPSP is determined (as indicated by the dark line within the ellipse). As described herein, the coordinate of this point may represent the delta velocity to apply to the reference vehicle V4. The collision avoidance component 220 may output information regarding the delta velocity (corresponding to trajectory adjustments) to the reference vehicle (e.g., as described above with respect to process block 460).

The above process may be repeated at a subsequent time step (e.g., a subsequent second) in which all vehicles are again analyzed for collision detection. As an example, the collision avoidance component 220 may identify collision pairs at a subsequent time step and generate a collision pair matrix. Table 5 illustrates an example collision pair matrix at the subsequent time step (e.g., generated by the collision avoidance component 220 in accordance with process step 410).

TABLE 5

Example Collision Pair Matrix

| | V1 | V2 | V3 | V4 |
|---|---|---|---|---|
| V1 | — | x | x | — |
| V2 | x | — | x | — |
| V3 | x | x | — | — |
| V4 | — | — | — | — |

As described herein, the collision avoidance component 220 may select reference vehicles (e.g., as described above with respect to process block 420). In this example, the collision avoidance component 220 may select V1 and V3 as reference vehicles (e.g., the vehicles to move to resolve the collisions) and may update the collision pair as shown in Table 6.

TABLE 6

Example Collision Pair Matrix
After Selecting Reference Vehicles

| | V1 | V2 | V3 | V4 |
|---|---|---|---|---|
| V1, R | — | x | x | — |
| V2 | — | — | — | — |
| V3, R | — | x | — | — |
| V4 | — | — | — | — |

Figure 6A:
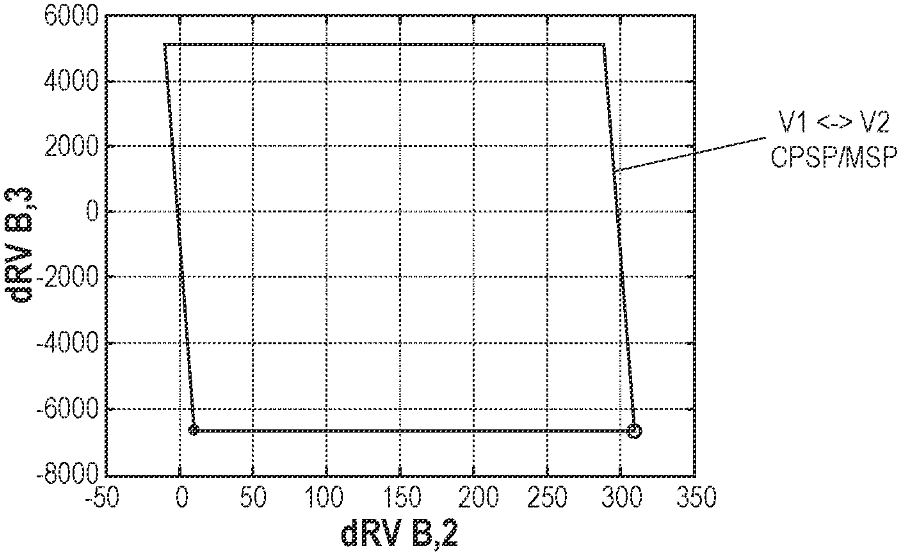
FIGS. 6A-6E illustrate an example of using constraint wrapping of Collision Pair Solution Polygons (CPSPs) for multiple object collision avoidance using a "steer-off" avoidance approach.
Figure 6B:
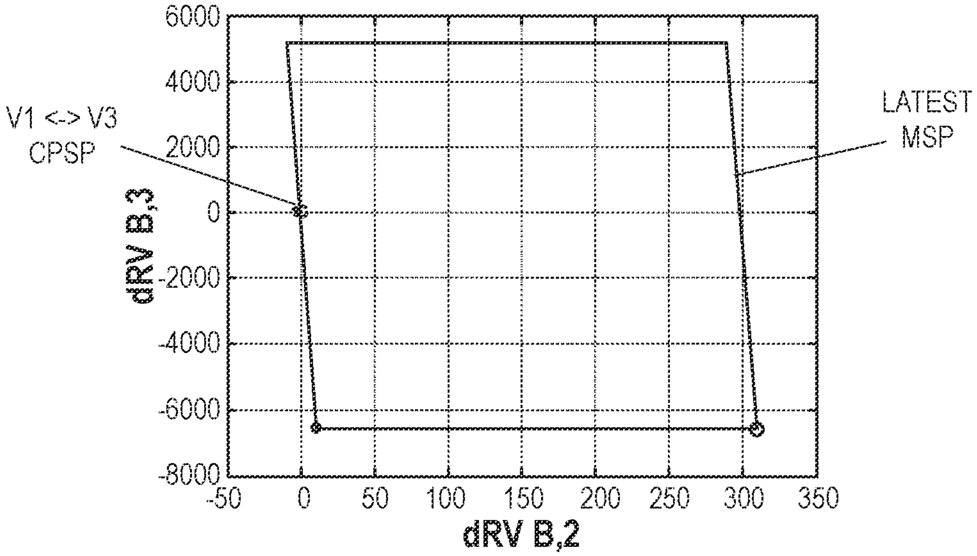
Figure 6C:
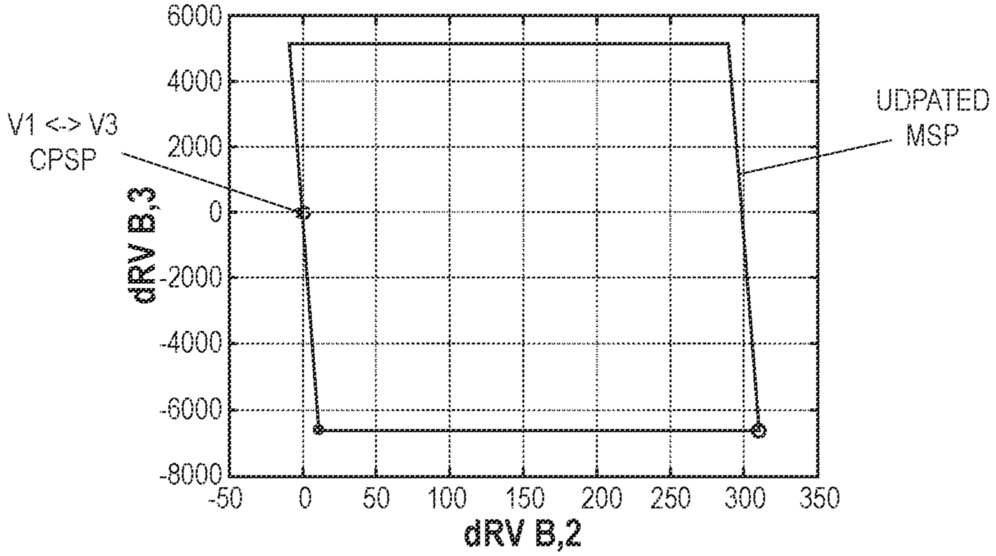
Figure 6D:
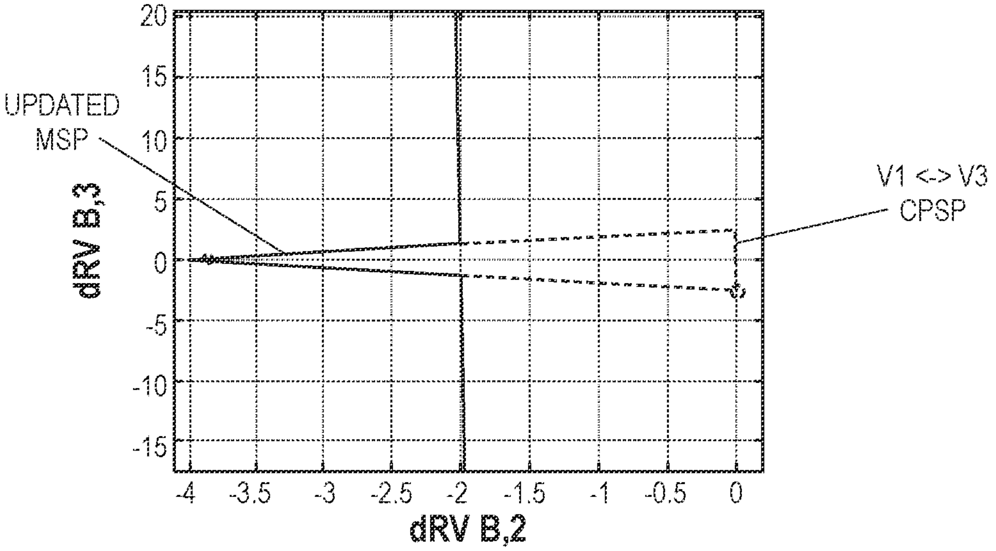
Figure 6E:
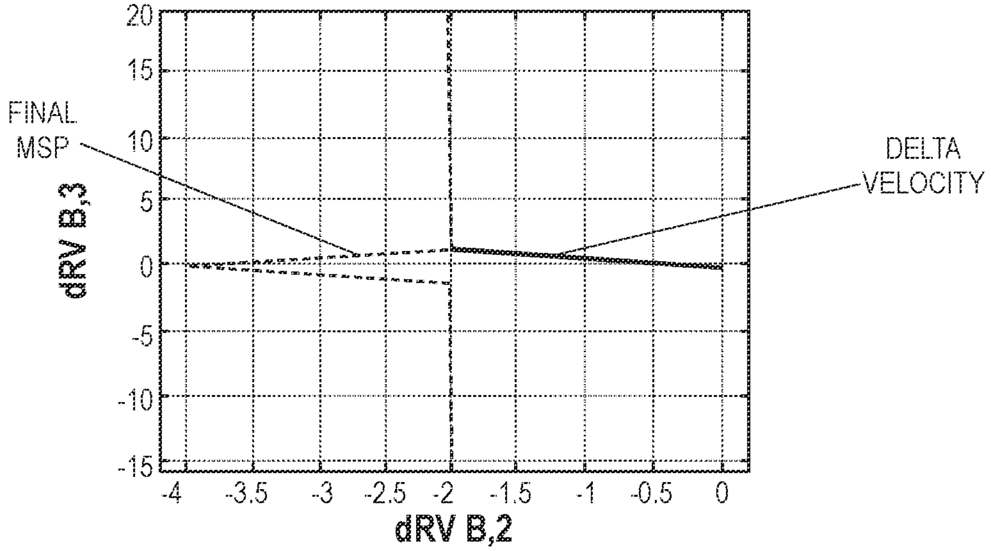

As shown in Table 6, the row representing V2 is no longer showing a risk of collision with V1, as the collision between V1 and V2 may be resolved by the first row representing V1 as the reference vehicle to move. As further shown in Table 6, V1 may be at risk for collision with multiple vehicles V2 and V3, and V3 may be at risk for collision with V2. Thus, multiple object collision avoidance techniques, described herein, may be applied to resolve (e.g., avoid) the collisions in the group V1↔(V2, V3). Single object collision avoidance techniques may be applied to resolve the collision between V3 and V2. With consideration to resolving the multiple collisions in the group V1↔(V2, V3), the collision avoidance component 220 may select a "steer-off" collision avoidance approach and may generate CPSPs for each collision pair based on ZEM vector solution equation for the steer-off approach. Depending on TUC value, the collision avoidance component 220 may select a "steer-off" collision avoidance approach for collision pair V1↔V2, and select a "dogleg" collision avoidance approach for collision pair V1↔V3, and may generate CPSPs for each collision pair based on ZEM vector solution equation for the selected approach. Similar to the techniques described above, the collision avoidance component 220 may generate the CPSP representing the collision space between V1↔V2 (as shown in FIG. 6A), which is also the MSP since only one CPSP has been generated at this point. The CPSP representing the collision space between V1↔V3 may be overlaid on top of the MSP (e.g., as shown in FIG. 6B). The MSP of V1↔V2, V3 may be formed as the union of the CPSP of V1↔V3 and the CPSP of V1↔V2 (e.g., as shown in FIG. 6C). FIG. 6D expands or "zooms in" the view of the MSP of V1↔V2, V3 shown in FIG. 6C to more clearly show the collision space. As described herein, the minimal delta velocity to exit the collision space is shown in FIG. 6E (e.g., by the solid line) in which the delta velocity to move V1 is determined to be (−2.01, 1.28). The collision avoidance component 220 may provide this delta velocity to the V1 such that collisions between V1, V2, and V3 are avoided. The above process may be repeated at a subsequent time interval to detect and mitigate (e.g., avoid) vehicle collisions).

Figure 7:
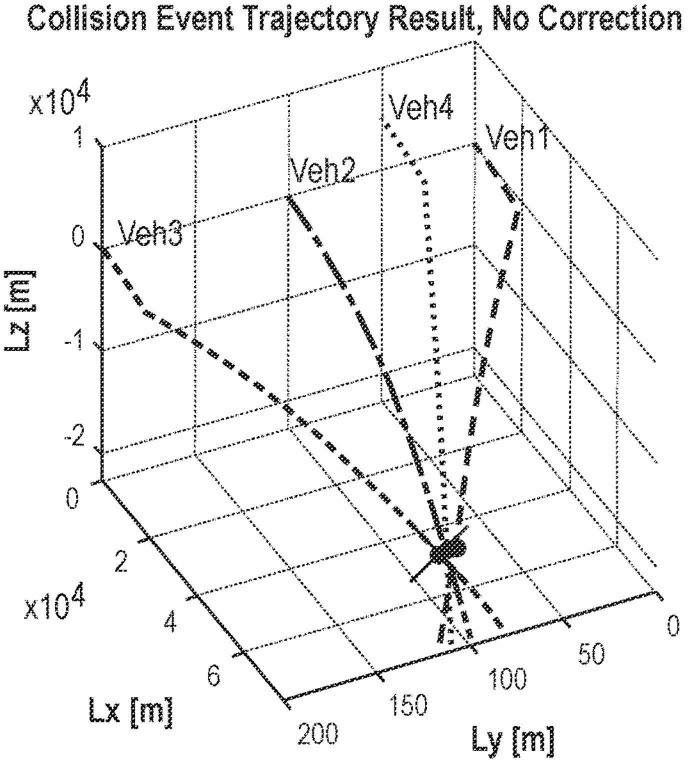
FIG. 7 illustrates an example simulation illustrating the collision avoidance techniques, described herein, for avoiding a multiple vehicle collision.
Figure 7:
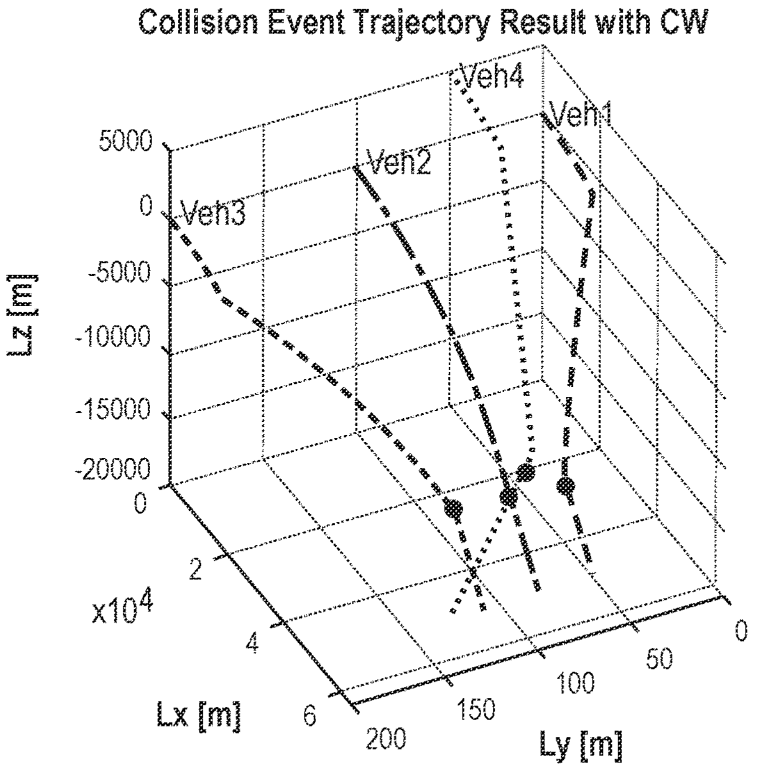

FIG. 7 illustrates an example simulation illustrating the collision avoidance techniques, described herein, for avoiding a multiple vehicle collision. More specifically, FIG. 7 illustrates two 3-D graphs 710 and 720 that plot the trajectories of four vehicles (e.g., Veh1, Veh2, Veh3, and Veh4) in a 3-D coordinate plane representing a 3-D space. As shown in FIG. 7, graph 710 illustrates that the four vehicles are expected to collide with each other if no collision avoidance correction is applied. Conversely, graph 720 illustrates that the collisions may be avoided when the collision avoidance techniques, described herein, are applied. Further, collisions may be avoided in a manner that minimizes fuel consumption and/or disruption in trajectory. For example, the minimum delta velocity may be determined to the avoid collisions.

Figure 8:
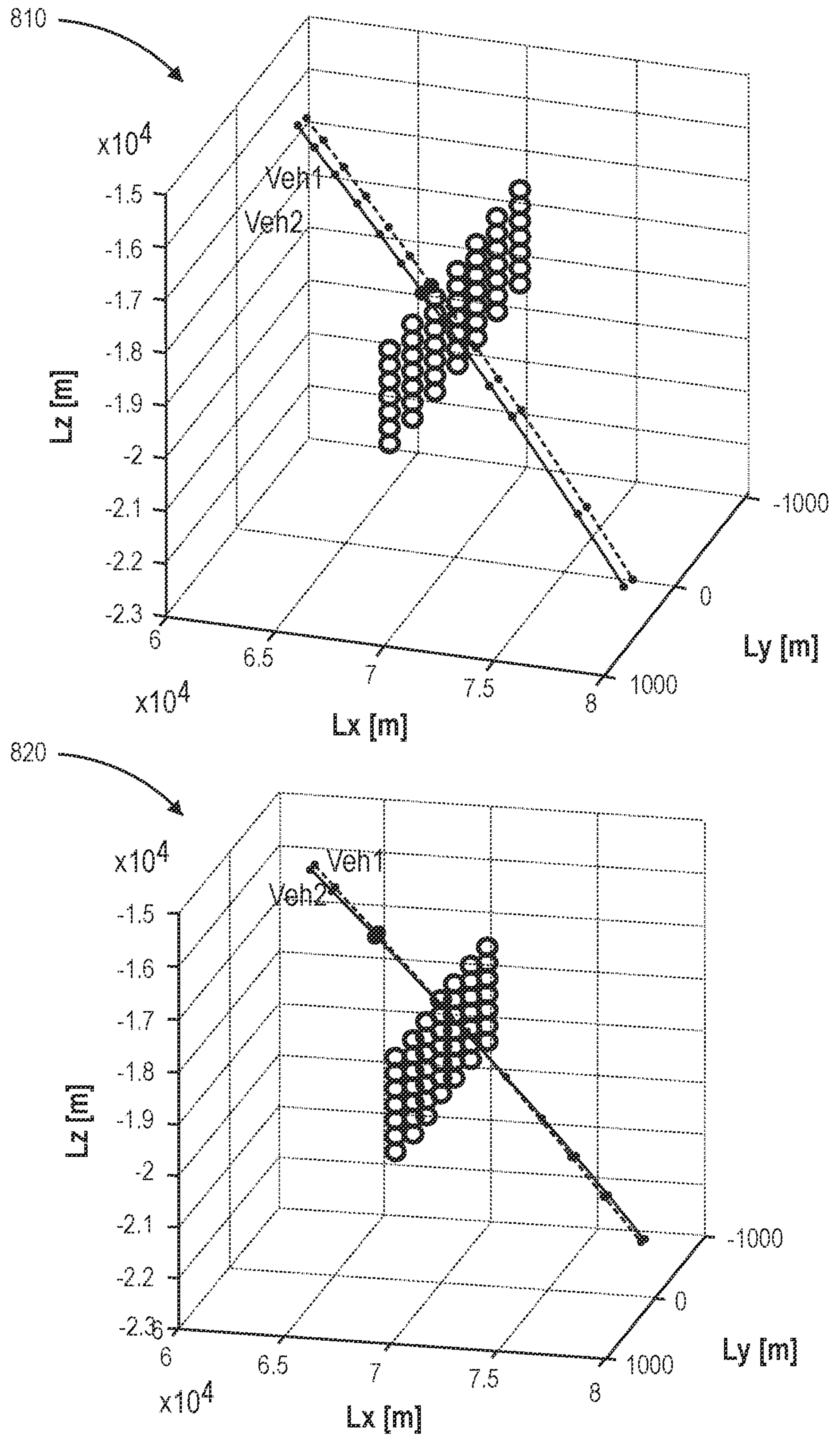
FIG. 8 illustrates an example simulation illustrating the collision avoidance techniques, described herein, for avoiding multiple vehicles from colliding with or passing through a space separated by a barrier.

FIG. 8 illustrates an example simulation illustrating the predictive collision avoidance techniques, described herein, for avoiding multiple vehicles from colliding with or passing through a space separated by a barrier (e.g., a physical barrier, a non-physical demarcation line represented by a set of coordinates, etc.). More specifically, FIG. 8 illustrates two 3-D graphs 810 and 820 that plot the trajectories of two vehicles (e.g., Veh1 and Veh2) in a 3-D coordinate plane representing a 3-D space. As shown in FIG. 8, graph 810 illustrates that the two vehicles are each expected to collide with the barrier if no collision avoidance correction is applied. Conversely, graph 820 illustrates that the collisions may be avoided when the collision avoidance techniques, described herein, are applied. Further, collisions may be avoided in a manner that minimizes fuel consumption and/or disruption in trajectory. For example, the minimum delta velocity may be determined to avoid collision with the barrier, without risk of colliding with each other.

Figure 9:
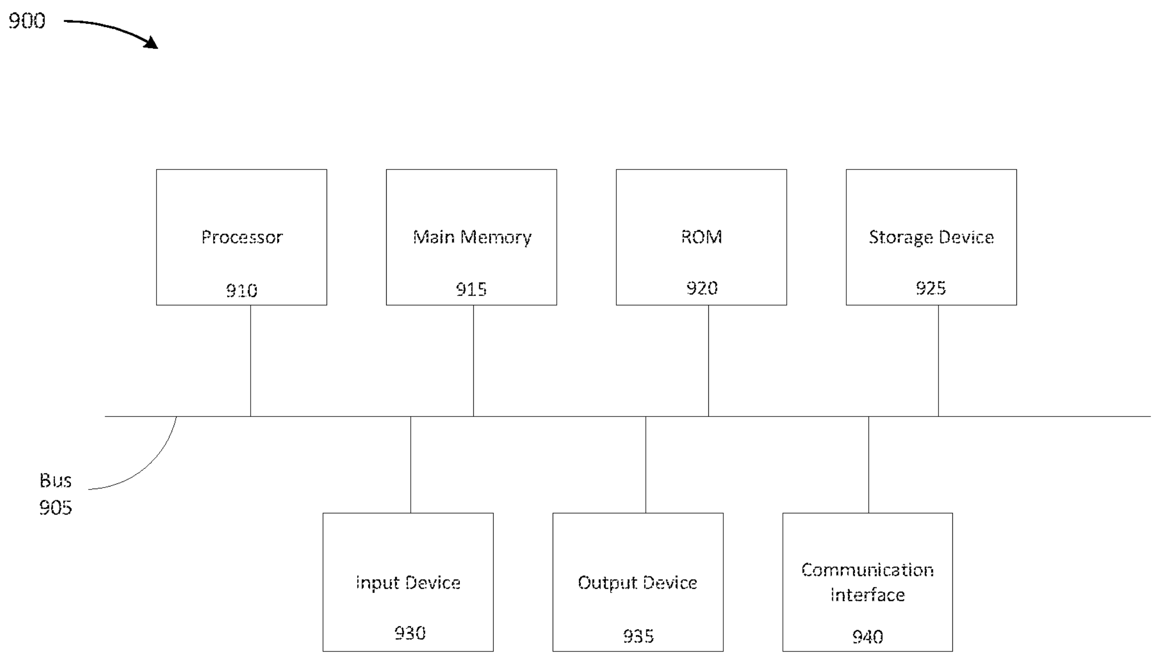
FIG. 9 illustrates example components of a device that may be used within environment of FIG. 1.

FIG. 9 illustrates example components of a device 900 that may be used within environment 100 of FIG. 1. Device 900 may correspond to the vehicles 110 and the centralized coordinated vehicle guidance system 120. Each of the vehicles 110 and the centralized coordinated vehicle guidance system 120 may include one or more devices 900 and/or one or more components of device 900.

As shown in FIG. 9, device 900 may include a bus 905, a processor 910, a main memory 915, a read only memory (ROM) 920, a storage device 925, an input device 930, an output device 935, and a communication interface 940.

Bus 905 may include a path that permits communication among the components of device 900. Processor 910 may include a processor, a microprocessor, an application specific integrated circuit (ASIC), a field programmable gate array (FPGA), or another type of processor that interprets and executes instructions. Main memory 915 may include a random access memory (RAM) or another type of dynamic storage device that stores information or instructions for execution by processor 910. ROM 920 may include a ROM device or another type of static storage device that stores static information or instructions for use by processor 910. Storage device 925 may include a magnetic storage medium, such as a hard disk drive, or a removable memory, such as a flash memory.

Input device 930 may include a component that permits an operator to input information to device 900, such as a control button, a keyboard, a keypad, or another type of input device. Output device 935 may include a component that outputs information to the operator, such as a light emitting diode (LED), a display, or another type of output device. Communication interface 940 may include any transceiver-like component that enables device 900 to communicate with other devices or networks. In some implementations, communication interface 940 may include a wireless interface, a wired interface, or a combination of a wireless interface and a wired interface. In embodiments, communication interface 940 may receiver computer readable program instructions from a network and may forward the computer readable program instructions for storage in a computer readable storage medium (e.g., storage device 925).

Device 900 may perform certain operations, as described in detail below. Device 900 may perform these operations in response to processor 910 executing software instructions contained in a computer-readable medium, such as main memory 915. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 915 from another computer-readable medium, such as storage device 925, or from another device via communication interface 940. The software instructions contained in main memory 915 may direct processor 910 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 900 may include additional components, fewer components, different components, or differently arranged components than are shown in FIG. 9.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method performed by a vehicle guidance system comprising:

obtaining analytics data for a plurality of vehicles or objects centrally communicating with or detected by the vehicle guidance system;

detecting, based on the analytics data, a potential collision event involving multiple pairs of the plurality of vehicles or objects, wherein detecting the potential collision event comprises determining a zero-effort miss vector, wherein the zero-effort miss vector indicates a minimum relative position vector that occurs as a first vehicle of the plurality of vehicles or objects passes a second vehicle or object of the plurality of vehicles or objects, assuming that a thrust vector of the second vehicle or object ceases and the first vehicle and the second vehicle or object coast under the acceleration of gravity only;

determining trajectory adjustment information for the first vehicle involved in the potential collision event; and adjusting the trajectory of the first vehicle based upon the trajectory adjustment information to provide real-time autonomous collision avoidance.

2. The method of claim 1, wherein the determining the trajectory adjustment information comprises:

generating a first Collision Pair Solution Polygon (CPSP) representing a predicted collision space between the first vehicle and a second vehicle of the plurality of vehicles involved in the collision event;

generating a second CPSP representing a predicted collision space between the first vehicle and a third vehicle of the plurality of vehicles involved in the collision event; and generating a Multiple Solution Polygon (MSP) based on the first CPSP and the second CPSP; and determining a delta velocity corresponding to the trajectory adjustment information based on the MSP.

3. The method of claim 1, further comprising selecting a trajectory adjustment approach based on a time use condition value, wherein the determining the trajectory adjustments are based on the selected trajectory adjustment approach.

4. The method of claim 1, wherein the plurality of vehicles or objects are traveling along intersecting paths.

5. The method of claim 1, further comprising:

generating a data structure identifying a plurality of predicted vehicle-object pairs for vehicles and objects connected to or detected by the vehicle guidance system; and detecting collision events within each of the plurality of predicted vehicle-object pairs identified in the data structure;

determining respective trajectory adjustments for respective vehicles in each of the plurality of predicted vehicle-object pairs; and outputting the respective trajectory adjustments causing the respective vehicles to modify trajectories.

6. The method of claim 1, wherein the analytics data comprises at least one of:

vehicle sensor readings;
vehicle speed;
vehicle acceleration;
vehicle position;
vehicle actual and planned trajectory;
vehicle specifications;
vehicle maneuver capabilities;
object shape;
object dimensions;
object image data;
object type;
object velocity;
object acceleration; and
object travel path.

7. The method of claim 1, wherein the trajectory adjustment information comprises at least one of:

a change in vehicle speed;
a change in vehicle travel direction;
guidance vectors;
navigation data; and
vehicle propulsion control instructions.

8. The method of claim 1, wherein detecting the potential collision event further comprises determining a time value to a zero-effort miss point, wherein the time value comprises a time when the minimum relative position vector will occur, wherein a magnitude of the zero-effort miss vector being smaller than a combined size of the first vehicle and the second vehicle or object, and the time value being less than a predetermined time threshold, indicates the potential collision event.

9. The method of claim 1, wherein detecting the potential collision event comprises:

generating a first collision pair solution polygon (CPSP) representing a predicted collision space between the first vehicle and a second of the vehicles or objects involved in the collision event;

generating a second CPSP representing a predicted collision space between the first vehicle and a third of the vehicles or objects involved in the collision event;

overlaying the first and second CPSPs;

determining a union of a solution boundary based upon the overlaid first and second CPSPs, wherein the union forms an updated multiple solution polygon (MSP); and determining a minimum change in velocity of the first vehicle to avoid the potential collision event based at least partially upon the union of the solution boundary.

10. A computer program product comprising a computer readable storage medium having program instructions embodied therewith, the program instructions being executable by a computing device of vehicle guidance system to cause the computing device to perform operations comprising:

obtaining analytics data for a plurality of vehicles or objects centrally communicating with or detected by the vehicle guidance system;

detecting, based on the analytics data, a potential collision event involving multiple pairs of the plurality of vehicles or objects, wherein detecting the potential collision event comprises determining a zero-effort miss vector, wherein the zero-effort miss vector indicates a minimum relative position vector that occurs as a first vehicle of the plurality of vehicles or objects passes a second vehicle or object of the plurality of vehicles or objects, assuming that a thrust vector of the second vehicle or object ceases and the first vehicle and the second vehicle or object coast under the acceleration of gravity only;

determining trajectory adjustment information for the first vehicle involved in the potential collision event; and adjusting the trajectory of the first vehicle based upon the trajectory adjustment information to provide real-time autonomous collision avoidance.

11. The computer program product of claim 10, wherein the operations for determining the trajectory adjustment information comprises:

generating a first Collision Pair Solution Polygon (CPSP) representing a predicted collision space between the first vehicle and a second vehicle of the plurality of vehicles involved in the collision event;

generating a second CPSP representing a predicted collision space between the first vehicle and a third vehicle of the plurality of vehicles involved in the collision event; and generating a Multiple Solution Polygon (MSP) based on the first CPSP and the second CPSP; and determining a delta velocity corresponding to the trajectory adjustment information based on the MSP.

12. The computer program product of claim 10, wherein the operations further comprise selecting a trajectory adjustment approach based on a time use condition value, wherein the determining the trajectory adjustments are based on the selected trajectory adjustment approach.

13. The computer program product of claim 10, wherein the plurality of vehicles or objects are traveling along intersecting paths.

14. The computer program product of claim 10, wherein the operations further comprise:

generating a data structure identifying a plurality of predicted vehicle-object pairs for vehicles and objects connected to or detected by the vehicle guidance system; and detecting collision events within each of the plurality of predicted vehicle-object pairs identified in the data structure;

determining respective trajectory adjustments for respective vehicles in each of the plurality of predicted vehicle-object pairs; and outputting the respective trajectory adjustments causing the respective vehicles to modify trajectories.

15. The computer program product of claim 10, wherein the analytics data comprises at least one of:

vehicle sensor readings;
vehicle speed;

vehicle acceleration;
vehicle position;
vehicle actual and planned trajectory;
vehicle specifications;
vehicle maneuver capabilities;
object shape;
object dimensions;
object image data;
object type;
object velocity;
object acceleration; and
object travel path.

16. The computer program product of claim 10, wherein the trajectory adjustment information comprises at least one of:

a change in vehicle speed;
a change in vehicle travel direction;
guidance vectors;
navigation data; and
vehicle propulsion control instructions.

17. A system comprising:

a processor, a computer readable memory, a non-transitory computer readable storage medium associated with a computing device of a vehicle guidance system, and program instructions executable by the computing device to cause the computing device to perform operations comprising:

obtaining analytics data for a plurality of vehicles or objects centrally communicating with or detected by the vehicle guidance system;

detecting, based on the analytics data, a potential collision event involving multiple pairs of the plurality of vehicles or objects, wherein detecting the potential collision event comprises determining a zero-effort miss vector, wherein the zero-effort miss vector indicates a minimum relative position vector that occurs as a first vehicle of the plurality of vehicles or objects passes a second vehicle or object of the plurality of vehicles or objects, assuming that a thrust vector of the second vehicle or object ceases and the first vehicle and the second vehicle or object coast under the acceleration of gravity only;

determining trajectory adjustment information for the first vehicle involved in the potential collision event; and adjusting the trajectory of the first vehicle based upon the trajectory adjustment information to provide real-time autonomous collision avoidance.

18. The system of claim 17, wherein the operations for determining the trajectory adjustment information comprises:

generating a first Collision Pair Solution Polygon (CPSP) representing a predicted collision space between the first vehicle and a second vehicle of the plurality of vehicles involved in the collision event;

generating a second CPSP representing a predicted collision space between the first vehicle and a third vehicle of the plurality of vehicles involved in the collision event; and generating a Multiple Solution Polygon (MSP) based on the first CPSP and the second CPSP; and determining a delta velocity corresponding to the trajectory adjustment information based on the MSP.

19. The system of claim 17, wherein the operations further comprise selecting a trajectory adjustment approach based on a time use condition value, wherein the determining the trajectory adjustments are based on the selected trajectory adjustment approach.

* * * * *